Figure 1:
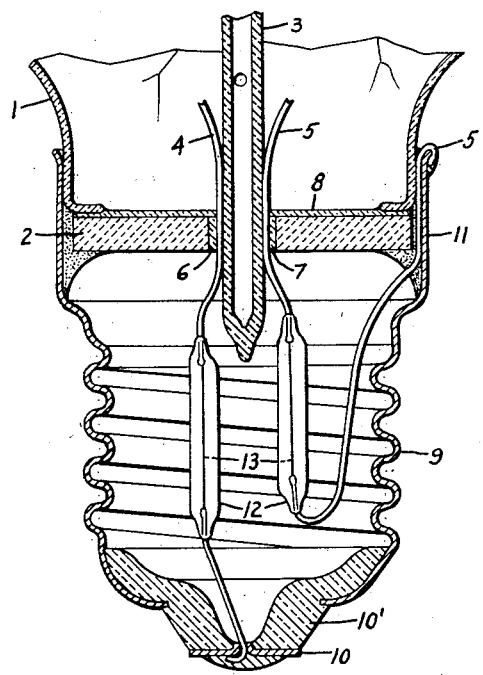

May 2, 1939. H. JANCKE ET AL 2,156,988

ELECTRIC LAMP AND SIMILAR DEVICE

Filed Feb. 4, 1938

Inventors:
Hans Jancke,
Martin Reger,
by Harry E. Dunham
His Attorney.

Patented May 2, 1939

2,156,988

UNITED STATES PATENT OFFICE 2,156,988

ELECTRIC LAMP AND SIMILAR DEVICE

Hans Jancke, Berlin, and Martin Reger, Berlin-Charlottenburg, Germany, assignors to General Electric Company, a corporation of New York Application February 4, 1938, Serial No. 188,744
In Germany February 9, 1937

3 Claims. (Cl. 176—38)

Our invention relates to electric lamps and similar devices in which an electric energy translation element is sealed within an envelope. More particularly, our invention relates to a sealing body for hermetically sealing the envelope of an electric lamp or similar device.

Sintered molded bodies of a ceramic material have been used quite frequently as the sealing body or base for the envelopes of electric lamps or discharge devices, since such molded bodies can be readily manufactured from easily obtainable raw materials and are characterized by a high strength. Furthermore, such molded bodies can be readily united to the envelope of the lamp, which envelope generally consists either of glass or metal, either directly or through the medium of a glass flux or solder, and can also be sealed hermetically to the metallic current-supply wires of the lamp or similar device.

Heretofore, sintered sealing bodies of a ceramic material had to be generally heated to a temperature of 1400° C. and above during manufacture to render the same suitable for their intended use. We have discovered, however, that by sintering the sealing body in such manner as to make it porous and then coating over the entire internal surface of the same with a layer of a readily fusible glass, a much lower temperature is sufficient for the sintering operation, such temperature as a rule amounting to only about 900 to 1100° C. The layer of readily fusible glass hermetically seals the porous sintered body with respect to the inside of the envelope and also hermetically unites the said body to the envelope. In certain instances, the layer of readily fusible glass also serves to hermetically seal the current supply wires in the sealing body. By means of the previously referred to reduction in the degree of sintering temperature, not only power costs are saved but the number of rejections during manufacture are reduced, and as a result the total manufacturing costs of the sealing body are considerably reduced. Moreover, the porously sintered sealing body can be given the final desired shape more rapidly and more readily than heretofore because of the better workability thereof. This also reduces the manufacturing costs. The porosity of the sealing body further results in a greater resistance to temperature changes and so permits a greater range of differences in the coefficients of expansion between the ceramic part and the glass part or between the ceramic part and the metal, since the porously sintered sealing body or base is slightly elastic in itself to a certain extent and consequently will better yield to tensile and compression stresses. A further advantage of our invention lies in the fact that the layer of readily fusible glass on the internal surface of the sealing body adheres particularly well thereto by reason of its penetration into the fine pores of the sealing body, so that a loosening of the said layer does not occur.

One object of our invention is to provide a ceramic sealing body for electric lamps or similar devices which may be sintered at relatively low temperatures and can be manufactured at low cost.

Another object of our invention is to provide a sealing member for electric lamps and similar devices which consists of a porous sintered body of a ceramic material having a layer of a readily fusible glass coated over its entire internal surface to thereby render the porous body impervious to air and to hermetically unite said body to the lamp envelope and to the current-supply wires passing through the body.

Still another object of our invention is to provide a ceramic sealing member for electric lamps and similar devices which is slightly elastic in itself to thereby permit a greater differential in the coefficients of expansion between the ceramic member and the glass or metal parts while still maintaining an effective hermetic seal therebetween.

Further objects and advantages of our invention will be apparent from the following detailed description of species thereof and from the accompanying drawing.

Figure 1A:
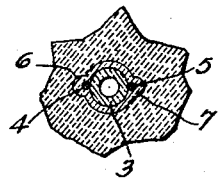
Figure 2:
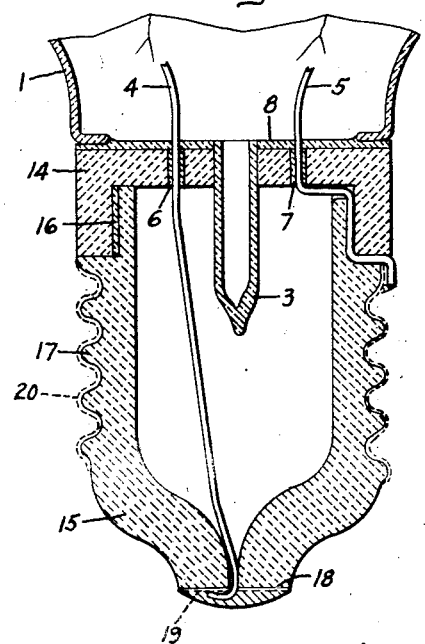

In the drawing, Fig. 1 is a fragmentary longitudinal sectional view of the base portion of an electric lamp comprising our invention; Fig. 1a is a sectional plan view of the central portion of the ceramic disc or body forming the end closure for the lamp bulb; and Fig. 2 is a view similar to Fig. 1 of a modified form of our invention.

Referring to Fig. 1, the lamp there shown comprises a glass envelope or bulb 1 the neck of which is closed by a sealing body or disc 2 according to our invention. A glass exhaust tube 3 and two current supply leaks 4, 5 extend through a centrally located opening in the disc 2 into the lamp bulb 1, the leads 4, 5 preferably being sealed to the disc 2 by means of glass flux 6 and 7. The exhaust tube 3 provides a passageway into the interior of the bulb by means of which the bulb may be evacuated and filled, where desired, with a suitable gas or a suitable gas mixture, such as, for instance, a mixture of argon and nitrogen or krypton and nitrogen. The exhaust tube 3 may also be used in a known manner as a supporting stem for a coiled filament (not shown) located in the lamp bulb.

The sealing disc 2 consists of a ceramic material which is highly reflective and which is preferably white in appearance. Such a material may consist of a mixture of approximately 50 per cent magnesium oxide and 50 per cent titanium dioxide, or of a mixture of approximately 70 per cent magnesium oxide, 29 per cent beryllium oxide and 1 per cent titanium dioxide. The ceramic sealing body or disc is sintered at approximately 1000° C. so as to form a porous body.

The porously sintered ceramic disc 2 is coated over its entire internal surface with a layer 8 of a glass having a low melting point. A suitable glass for this purpose may consist of the following composition:

| | Per cent |
|---|---|
| Lead oxide (PbO) | 78.0 |
| Boric acid ($B_2O_3$) | 8.0 |
| Silicic acid ($SiO_2$) | 8.0 |
| Alumina ($Al_2O_3$) | 5.0 |
| Sodium oxide ($Na_2O$) | 1.0 |

In producing the layer of glass on the porous ceramic disc 2, the readily fusible glass is preferably pulverized and mixed with alcohol to form a paste which is then spread on the inner surface of the disc by means of a brush or a spray gun. The lamp bulb 1 is then placed on the disc 2, which has been previously provided with the exhaust tube 3 and the current supply wires 4, 5, and the unit placed in a heating furnace. The heat changes the layer of paste, which has been applied to the inner surface of the disc 2, into a glass coating 8 while the alcohol evaporates. On cooling, the coating solidifies in the form of glass, which then seals the pores of the disc 2 and at the same time forms a hermetic seal between the lamp bulb neck and the said disc. In certain instances it is also possible to hermetically seal the current supply leads 4, 5 with respect to the ceramic disc 2 by means of the glass coating 8 in cases where no special covering layers of a readily fusible glass or of glass flux are provided for this purpose.

A conventional lamp base, consisting of a threaded metal shell 9, a bottom center contact button or eyelet 10 and base insulation 10' is fastened to the ceramic disc 2 preferably by cement. The current supply lead 4 is connected to the bottom center contact eyelet 10, preferably by soldering, to thereby form the bottom contact of the lamp, while the other current supply wire 5 is bent back over the edge of the sleeve portion 11 of the base shell 9 to which portion it is connected, preferably by soldering. Each of the two current supply wires is preferably provided with a fuse 13 enclosed in a thin glass tube 12 so as to prevent the main fuse in the lamp circuit from blowing upon failure of the lamp filament.

In the modification of our invention shown in Fig. 2 an inverted cup-shaped sealing body 14 instead of the flat disc 2 of the previous form is employed. The inner or bulb-engaging surface of this body 14 is provided with a layer of a readily fusible glass 8 the same as in the preceding form of the invention. A base 15, also consisting of a ceramic material, is fastened to the inner surface of the cylindrical wall portion of the ceramic body 14 by means of a layer 16 of cement or of a glass flux. The said base 15 is formed with a screw thread 17. Both the screw thread 17 and the bottom surface 18 of the ceramic base are provided with metal coatings 19, 20 respectively which are sprayed thereon in a well-known manner. The external ends of the current supply leads 4, 5 are connected to the metallic coatings 19, 20 respectively by means of soldering. The current supply wires 4, 5 are hermetically sealed in the sealing body 14 independently of the exhaust tube 3, the said wires extending through and being sealed in suitably located openings in the body 14 through the medium of layers 6, 7 of glass flux.

While we have described our invention in connection with an electric incandescent lamp which may contain one or several filaments, the invention may be applied equally well to discharge tubes or lamps provided with the customary electrodes. Also, the lamp bulb 1, instead of being made of glass, may consist of a densely sintered ceramic material or of metal.

What we claim as new and desire to secure by Letters Patent of the United States is:

1. In an electric device, an envelope having an electric energy translation element sealed therein, a sealing member united to the end of said envelope and hermetically sealing the same, and current supply leads extending through said sealing member and connected to said energy translation element, said sealing member comprising a porous sintered body of a ceramic material provided with a layer of a readily fusible glass over its entire internal surface, said layer of glass hermetically sealing said porous body and forming a hermetic seal between the said envelope and the sealing member.

2. In an electric device, an envelope having an electric energy translation element sealed therein, a sealing member united to the end of said envelope and hermetically sealing the same, and current supply leads extending through said sealing member and connected to said energy translation element, said sealing member comprising a porous sintered body consisting of a mixture of approximately fifty per cent magnesium oxide and fifty per cent titanium dioxide and being provided with a layer of a readily fusible glass over its entire internal surface.

3. In an electric device, an envelope having an electric energy translation element sealed therein, a sealing member united to the end of said envelope and hermetically sealing the same, and current supply leads extending through said sealing member and connected to said energy translation element, said sealing member comprising a porous sintered body consisting of a mixture of approximately seventy per cent magnesium oxide, twenty-nine per cent beryllium oxide and one per cent titanium dioxide and being provided with a layer of a readily fusible glass over its entire internal surface.

HANS JANCKE.
MARTIN REGER.